United States Patent
Kim et al.

(10) Patent No.: US 10,618,397 B2
(45) Date of Patent: Apr. 14, 2020

(54) ENGINE MOUNT FOR VEHICLE

(71) Applicants: Hyundai Motor Company, Seoul (KR); Kia Motors Corporation, Seoul (KR)

(72) Inventors: Seung Won Kim, Seoul (KR); Hyo Seok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/055,108

(22) Filed: Aug. 5, 2018

(65) Prior Publication Data

US 2019/0160933 A1    May 30, 2019

(30) Foreign Application Priority Data

Nov. 24, 2017    (KR) .................. 10-2017-0158370

(51) Int. Cl.
| | |
|---|---|
| *B60K 5/12* | (2006.01) |
| *F16F 13/16* | (2006.01) |
| *F16F 13/14* | (2006.01) |
| *F16F 13/10* | (2006.01) |

(52) U.S. Cl.
CPC .......... *B60K 5/1283* (2013.01); *F16F 13/103* (2013.01); *F16F 13/1463* (2013.01); *F16F 13/16* (2013.01); *B60Y 2306/09* (2013.01)

(58) Field of Classification Search
CPC .... B60K 5/1283; F16F 13/1463; F16F 13/16; B60Y 2306/09
USPC .......................... 248/636, 637, 638, 671, 559
See application file for complete search history.

(56) References Cited

U.S. PATENT DOCUMENTS

| | | | |
|---|---|---|---|
| 5,280,886 A * | 1/1994 | Gartner ................ | B60K 5/1283 267/140.13 |
| 2006/0261531 A1* | 11/2006 | Kim ...................... | F16F 13/16 267/140.12 |
| 2012/0235334 A1* | 9/2012 | Suzuki .................. | F16F 1/3849 267/141 |
| 2017/0313171 A1* | 11/2017 | Yoon .................... | B60K 5/1208 |

\* cited by examiner

*Primary Examiner* — Muhammad Ijaz
(74) *Attorney, Agent, or Firm* — Mintz Levin Cohn Ferris Glovsky and Popeo, P.C.; Peter F. Corless

(57) ABSTRACT

The present disclosure provides an engine mount for a vehicle. The engine mount includes a rubber assembly that is connected between a vehicle body and an engine. A fluid sealing assembly is detachably assembled to the rubber assembly, allowing tuning of the engine mount to be performed by detaching the fluid sealing assembly while the engine remains connected to the engine mount.

9 Claims, 8 Drawing Sheets

[ ACCELERATION BOOMING TEST RESULT ]

[ N STAGE IDLE NOISE TEST RESULT ]

RELATED ART

ENGINE MOUNT FOR VEHICLE

CROSS-REFERENCE TO RELATED APPLICATION

This application claims priority to Korean Patent Application No. 10-2017-0158370 filed on Nov. 24, 2017, the entire contents of which are incorporated herein by reference.

BACKGROUND

(a) Technical Field

The present disclosure relates to an engine mount for a vehicle, and more particularly, to an engine mount for a vehicle having a structure in which a fluid sealing assembly is capable of being detached from a rubber assembly connected between a vehicle body and an engine.

(b) Background Art

Generally, when a powertrain that includes an engine and a transmission is mounted within an engine compartment of a vehicle, an engine mount for a vibration control is applied to a position where the engine is mounted and supported. The engine mount has different vibration characteristics of powertrains for each vehicle model, and is one of components that need to be tuned for the vibration control based on specifications of other systems (e.g., suspension, body, etc.).

Since each customer perceives vibration characteristics differently and has different preference for vibration characteristics, a tuning (e.g., modification) such as replacing the engine mount with one that has different specifications is performed after a mass production and a delivery of vehicles. Such tuning of the engine mount is cost-effective since the engine mount serves as a direct vibration transfer system.

However, it is generally difficult to tune the engine mount since the engine needs to be detached from the engine compartment and the engine mount needs to be fully detached to mount new tuning products, which requires professional mechanics and professional facilities. For example, as shown in FIG. 11, an engine 200 is detached by removing a support bracket 202 connected between an upper end part of an engine mount 100 and the engine 200 while the engine mount 100 is mounted on a vehicle body 102, and then the engine mount 100 is detached from the vehicle body 102 to mount new tuning products. Hence, a tuning of the engine mount requires professional mechanics and facilities with professional equipment. Accordingly, the tuning of the engine mount is not readily available for general customers.

The above information disclosed in this section is merely for enhancement of understanding of the background of the disclosure and therefore it may contain information that does not form the prior art that is already known in this country to a person of ordinary skill in the art.

SUMMARY

The present disclosure provides an engine mount for a vehicle which may include a rubber assembly connected between a vehicle body and an engine, and a fluid sealing assembly detachably assembled to the rubber assembly for tuning (e.g., modification) of the engine mount by detaching only the fluid sealing assembly while the engine remains connected to the engine mount.

In an aspect, the present disclosure provides an engine mount for a vehicle that may include a rubber assembly having a rubber housing which is connected between a vehicle body and an engine, and a fluid sealing assembly having a fluid housing which is detachably assembled in a rubber housing of the rubber assembly. The fluid sealing assembly may be detached from an upper part of the rubber assembly for tuning of the engine mount.

In an exemplary embodiment, the rubber assembly may include a rubber housing having a structure in which an upper part is open, the rubber housing being connected between the vehicle body and the engine, and a first main rubber vulcanized on a bottom surface of the rubber housing while surrounding a first core having a core bolt. An inner diameter surface of the rubber housing may include a locking guide groove which extends downward from a top end of the rubber housing and a locking aperture which extends in a perpendicular direction from a lower end of the locking guide groove. Further, the core bolt may protrude from a bottom of the rubber housing to be coupled to a vehicle body mounting bracket. An outer diameter surface of the rubber housing may be protrudedly provided with a coupling end which is coupled to an engine mounting bracket.

The fluid sealing assembly may include a fluid housing detachably inserted through an upper opening of the rubber housing; a diaphragm disposed at an upper end inside the fluid housing to maintain air tightness of an upper side of a fluid; an orifice structure having a fluid flow path in a vertical direction and stacked on a bottom part of the diaphragm; a membrane stacked at an opening of a center of the orifice structure to separate an upper fluid chamber and a lower fluid chamber; and a second main rubber having an outer circumferential surface that adheres to an inner diameter surface of the fluid housing while an edge part of an upper surface is stacked and supported on an edge of a bottom surface of the orifice structure to maintain air tightness of a lower side of a fluid and having a bottom surface that abuts an upper surface of a first main rubber of the rubber assembly.

Further, a lower end part of the fluid housing may be integrally formed with a plurality of hooks which are locked to an edge of a bottom surface of a second main rubber. An edge part of the second main rubber may include a second core, and a lower end part of the second core may protrude through a bottom surface of the second main rubber to be an object to which the plurality of hooks are locked. An outer diameter surface of the fluid housing may slide along a locking guide groove of the rubber housing and may then be integrally formed with a locking protrusion which is locked and inserted into a locking aperture. Additionally, an outer surface of the fluid housing may include a handle which rotates the fluid housing in a locking or unlocking direction.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
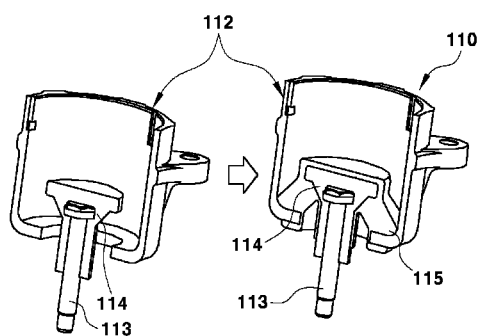
FIG. 1 is a perspective view showing a process of manufacturing a rubber assembly for an engine mount for a vehicle according to an exemplary embodiment of the present disclosure.

It should be understood that the accompanying drawings may not be to scale, may present a simplified representation of various features illustrative of the basic principles of the disclosure. The specific design features of the present disclosure as provided herein, including, for example, specific dimensions, orientations, locations, and shapes will be determined in part by the particular intended application and use environment. In the figures, reference numbers refer to the same or equivalent parts of the present disclosure throughout the figures.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in detail with reference to the accompanying drawings. According to the present disclosure, an engine mount may include a rubber assembly connected between a vehicle body and an engine and a fluid sealing assembly detachably assembled on an upper part of the rubber assembly to allow only the fluid sealing assembly to be detached, thereby facilitating an operation of tuning the engine mount.

Figure 2:
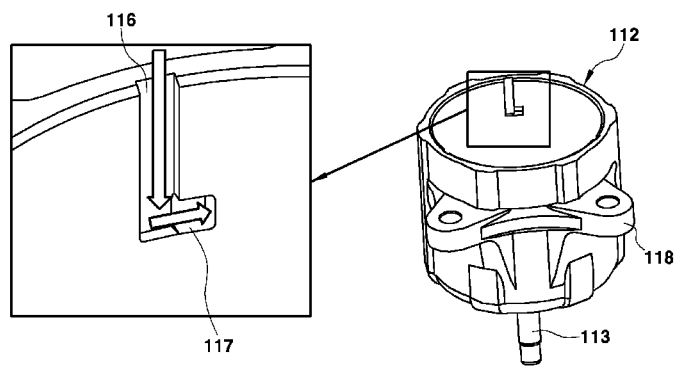
FIG. 2 is a perspective view showing a rubber assembly of the engine mount for a vehicle according to an exemplary embodiment of the present disclosure.
Figure 3:
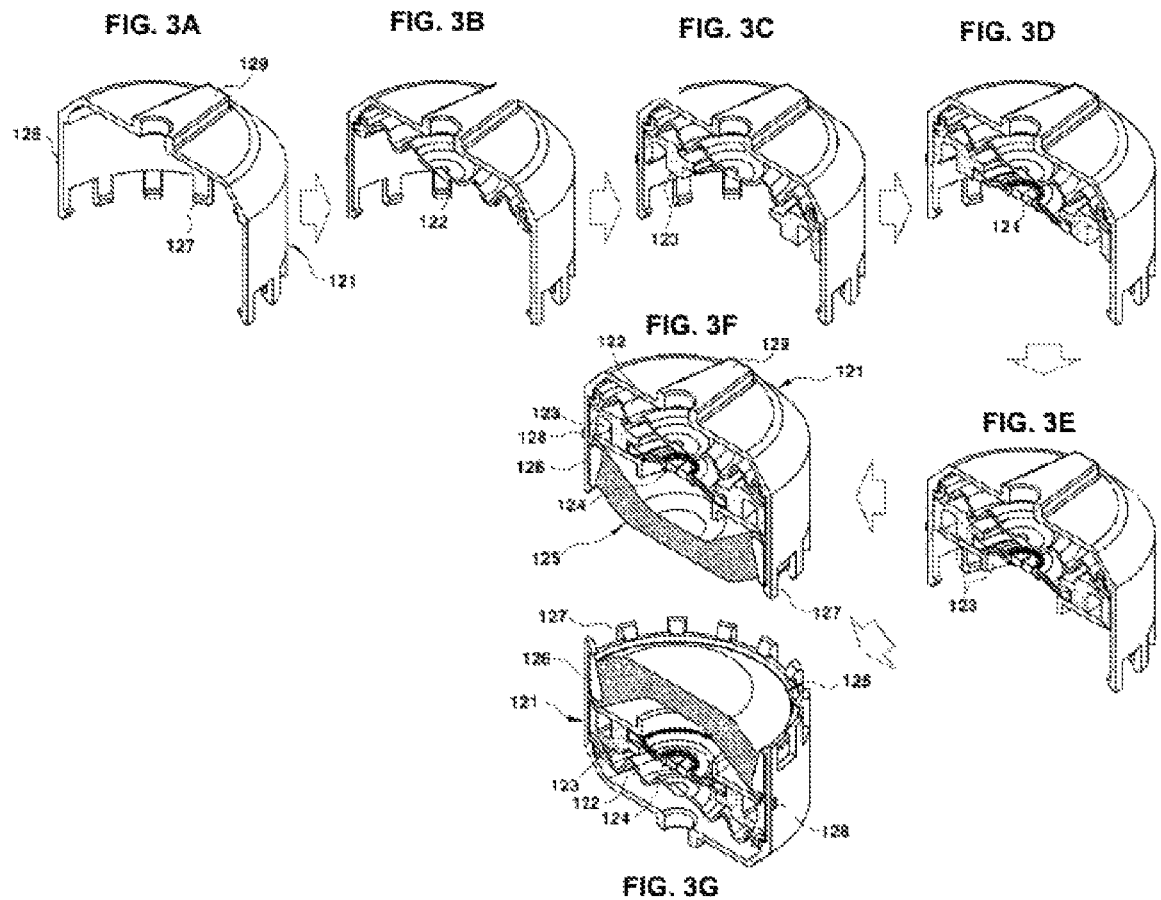
FIGS. 3A-3G are perspective views showing a process of assembling a fluid sealing assembly of the engine mount for a vehicle according to an exemplary embodiment of the present disclosure.
Figure 4:
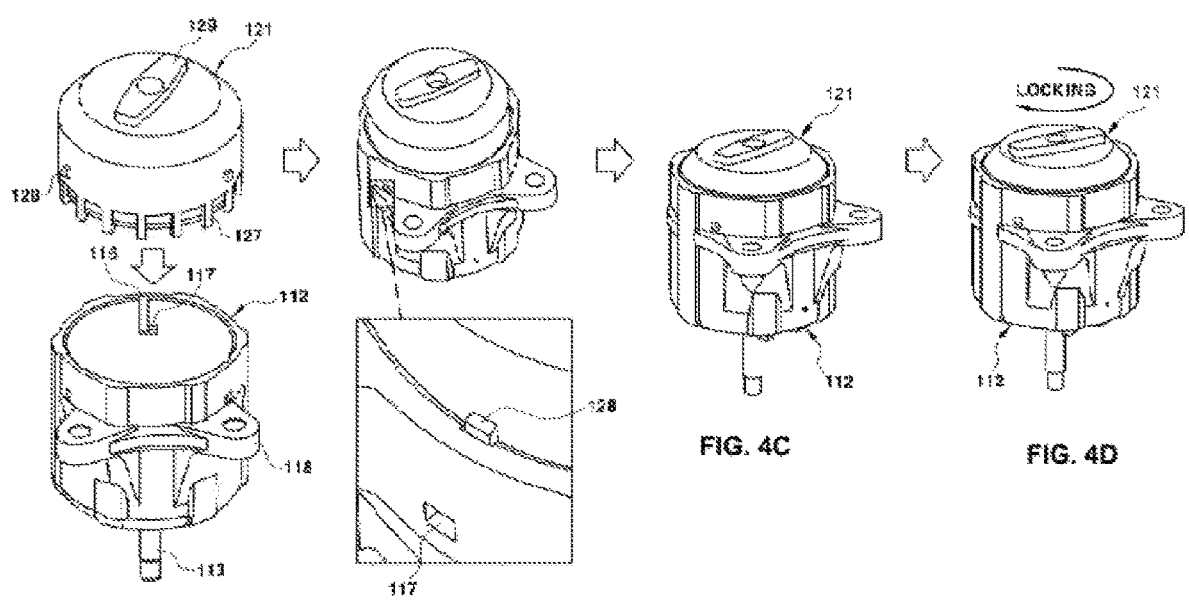
FIGS. 4A-4D are perspective views showing a process of mounting the fluid sealing assembly on the rubber assembly of the engine mount for a vehicle according to an exemplary embodiment of the present disclosure.

FIGS. 1 and 2 show a rubber assembly in components of an engine mount for a vehicle according to the present disclosure and a manufacturing procedure. Reference numeral 110 denotes the rubber assembly. The rubber assembly 110 may include a rubber housing 112, a first core 114 having a core bolt 113 disposed within the rubber housing 112, and a first main rubber 115 vulcanized to abut a bottom surface of the rubber housing 112 while surrounding the first core 114.

In particular, the rubber housing 112 may be formed in a cylindrical structure in which an upper part is open and a bottom surface includes an aperture through which the core bolt 113 may protrude. The rubber housing 112 may be connected between the vehicle body and the engine. The first core 114 may be disposed within the first main rubber 115 and serve as a skeleton of the first main rubber 115, and the core bolt 113 may be integrally embedded within the first core 114 when manufacturing the first core 114.

Figure 5:
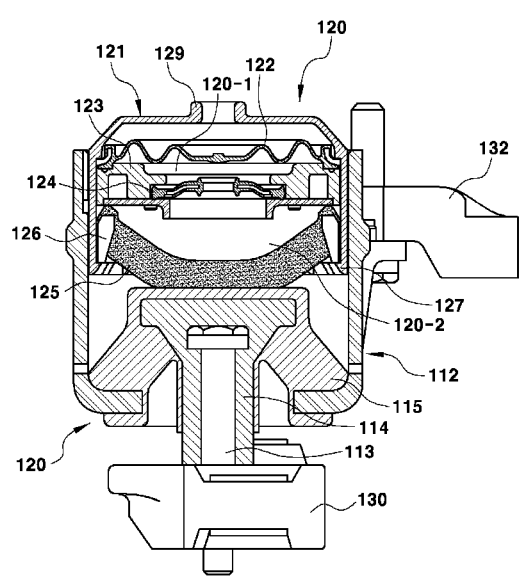
FIG. 5 is a cross-sectional view showing a state in which the fluid sealing assembly is assembled with the rubber assembly of the engine mount for a vehicle according to an exemplary embodiment of the present disclosure.

The core bolt 113 may protrude through the aperture which is disposed on the bottom surface of the rubber housing 112. As shown in FIG. 5, the core bolt 113 that protrudes from the bottom surface of the rubber housing 112 may be bolted to a vehicle body mounting bracket 130 coupled to the vehicle body. The first main rubber 115 may be vulcanized on the bottom surface of the rubber housing 112 while surrounding an outer surface of the first core 114 to absorb and remove vibrations in X, Y, and Z directions such as vibrations from vehicle driving and vibrations input from an engine.

In particular, to insert and lock the fluid sealing assembly 120 relative to the rubber assembly 110, at least three locations along a circumferential direction of an inner diameter surface of the rubber housing 112 may include a linear locking guide groove 116 which extends by a predetermined distance downwardly from a top end of the rubber housing 112 and a locking aperture 117 which extends in a perpendicular direction from a lower end of the locking guide groove 116. The outer diameter surface of the rubber housing 112 may be protrudedly provided with a coupling end which may be bolted to an engine mounting bracket 132 coupled to the engine.

FIGS. 3A-3G show the fluid sealing assembly for the engine mount for a vehicle according to an exemplary embodiment of the present disclosure and the process of assembling the same, and reference numeral 120 denotes the fluid sealing assembly. The fluid sealing assembly 120 may include a fluid housing 121 which may be detachably fastened to the rubber housing 112 of the rubber assembly 110. As described below, a lower end of the fluid housing 121 may be integrally formed with a plurality of hooks 127 which may be locked to a second core 126 that protrudes through a bottom surface of a second main rubber 125 and coupled thereto.

In addition, the outer diameter surface of the fluid housing 121 may be integrally formed with a locking protrusion 128 which may slide along the linear locking guide groove 116 of the rubber housing 112 and may then be locked into the locking aperture 117. Further, an upper surface of the fluid housing 121 may be integrally formed with a handle 129 configured to rotate the fluid housing 121 in a locking direction or an unlocking direction to insert the fluid sealing assembly 120 into the rubber assembly 110 and then lock or unlock the fluid sealing assembly 120.

Each component configuring the fluid sealing assembly may be stacked and assembled inside the fluid housing 121 having the above-mentioned structure. First, an upper end inside the fluid housing 121 may include a diaphragm 122 for maintaining air tightness of an upper side of a fluid. Then, an orifice structure 123, which includes a fluid flow path in a vertical direction, e.g., a fluid flow path between an upper fluid chamber and a lower fluid chamber, may be stacked on a bottom part of the diaphragm 122 while being spaced apart therefrom.

Subsequently, a membrane 124, which separates the upper fluid chamber and the lower fluid chamber, may be stacked on an open portion of a center of the orifice structure 123. The second main rubber 125 may then be stacked on a bottom edge of the orifice structure 123. In particular, an outer circumferential surface of the second main rubber 125 may adhere to the inner diameter surface of the fluid housing 121 while an edge part of an upper surface of the second main rubber 125 may be stacked and supported on the bottom edge of the orifice structure, thereby maintaining the air tightness of the lower side of the fluid.

The second core 126 may be embedded into an edge part of the second main rubber 125 and a lower end part of the second core 126 may protrude downward through the bottom surface of the second main rubber 125. The lower end part of the second core 126 may partially protrude through the bottom surface of the second main rubber 125 to allow the hook 127 of the fluid housing 121 to be locked to the second core 126 that is made of a metallic material, and not to the second main rubber 125 having an elasticity, and thus, the hook 127 may be firmly locked.

A space between the diaphragm 122 and the membrane 124 may be formed as an upper fluid chamber 120-1 and a space between the membrane 124 and the second main rubber 125 may be formed as a lower fluid chamber 120-2. Since the fluid may be injected into the upper fluid chamber 120-1 or the lower fluid chamber 120-2, the fluid may be injected by punching small apertures on the fluid housing 121 and the orifice structure 123. Then, the fluid may be injected into the upper fluid chamber 120-1 or the lower fluid chamber 120-2 through the fluid flow path of the orifice structure 123 and the small apertures formed on the fluid housing 121, and the orifice structure 123 may be sealed with a steel ball.

FIGS. 4A-4D show a process of mounting the fluid sealing assembly on the rubber assembly of the engine mount for a vehicle according to an exemplary embodiment of the present disclosure. The fluid sealing assembly 120 may be detachably mounted on the rubber assembly 110 manufactured as described above.

The fluid housing 121 may be inserted through an upper opening of the rubber housing 112, and the locking protrusion 128 of the fluid housing 121 may be inserted into the linear locking guide groove 116 of the rubber housing 112 while being vertically matched (e.g., aligned) therewith. Therefore, when the locking protrusion 128 slides downward along the linear locking guide groove 116 and then the handle 129 of the fluid housing 121 is gripped to rotate in the locking direction, the locking protrusion 128 may be locked into the locking aperture 117 to allow the fluid sealing assembly 120 to be mounted on the rubber assembly 110 as shown in FIG. 5.

Figure 6:
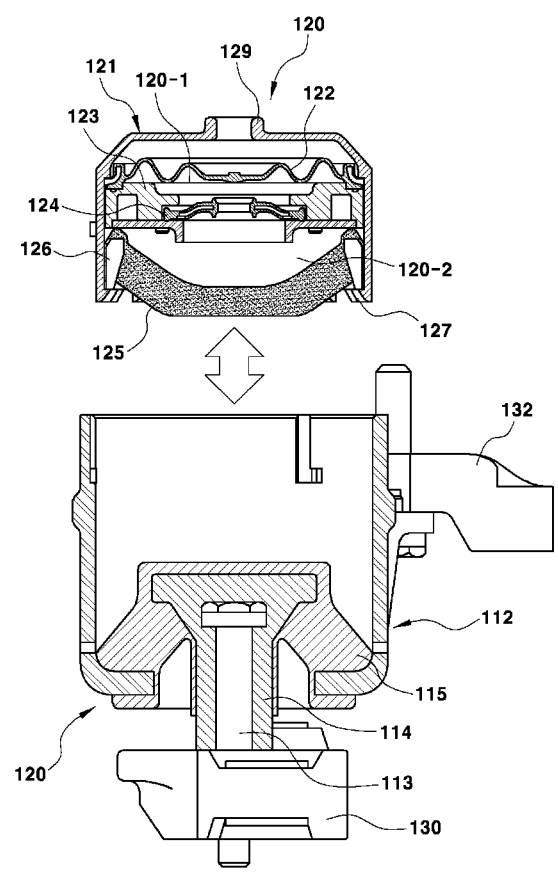
FIG. 6 is a cross-sectional view showing a state in which the fluid sealing assembly is detached from the rubber assembly of the engine mount for a vehicle according to an exemplary embodiment of the present disclosure.

Conversely, when the fluid sealing assembly 120 is detached from the rubber assembly 110, the handle 129 of the fluid housing 121 may be gripped to rotate in the unlocking direction and then the fluid housing 121 may be lifted up (e.g., withdrawn), to allow the fluid sealing assembly 120 to be detached from the rubber assembly 110 as shown in FIG. 6. As described above, when the mounting of the fluid sealing assembly 120 on the rubber assembly 110 is completed, the bottom surface of the second main rubber 125 may abut the upper surface of the first main rubber 115 as shown in FIG. 5.

Figure 8A:
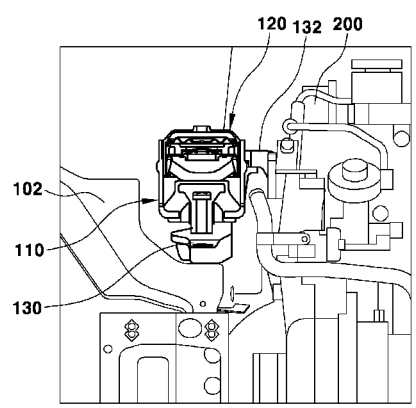
FIG. 8A is a perspective view showing a state in which the engine mount for a vehicle according to an exemplary embodiment of the present disclosure is mounted.
Figure 8B:
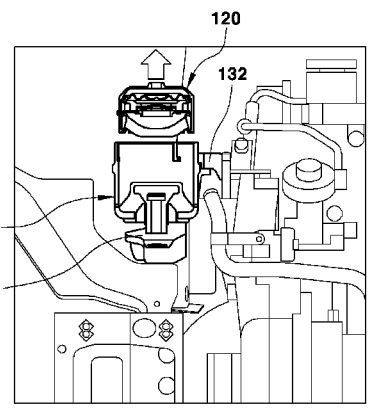
FIG. 8B is a perspective view showing a state in which the engine mount for a vehicle according to an exemplary embodiment of the present disclosure is detached.

After the mounting of the fluid sealing assembly 120 on the rubber assembly 110 is completed, the core bolt 113 may be bolted to the body mounting bracket 130 coupled to the vehicle body and the coupling end 118 formed on the outer diameter surface of the rubber housing 112 may be bolted to the engine mounting bracket 132 coupled to the engine to allow the engine mount to be mounted by being connected between the engine and the vehicle body as shown in FIGS. 8A and 8B. Therefore, the first main rubber 115 of the rubber assembly 110 may absorb and remove the vibrations in X, Y, and Z directions such as the vibration from vehicle driving and the vibrations that are input from the engine.

In addition, the second main rubber 125 of the fluid sealing assembly 120 may absorb and remove the vibrations in the Z direction such as the vibrations from the vehicle driving and the vibrations that are input from the engine. When the second main rubber 125 is deformed vertically, the fluid of the upper fluid chamber 120-1 may pass through the fluid flow path of the orifice structure 123 to move to the lower fluid chamber 120-2 or the fluid of the lower fluid chamber 120-2 may pass through the fluid flow path of the orifice structure 123 to move to the upper fluid chamber 120-1, thereby absorbing and removing the vibrations in the Z direction together with the second main rubber 125.

The second main rubber 125 of the fluid sealing assembly 120 may be used for the vibration control in the Z direction (e.g., vertical direction of the vehicle body) in addition to sealing the fluid, and the first main rubber 115 of the rubber assembly 110 may slide on the second main rubber 125 when the vibrations in the X direction (e.g., vehicle length direction or longitudinal direction) and the Y direction (e.g, vehicle width direction or lateral direction) are controlled.

Figure 7:
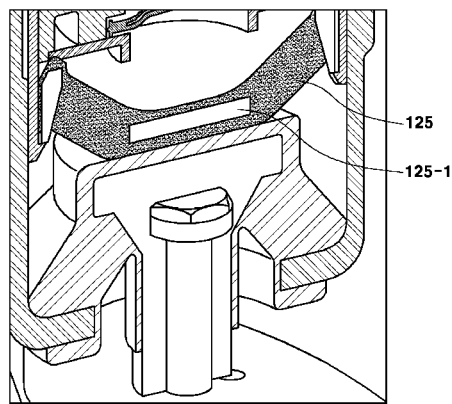
FIG. 7 is a cross-sectional view showing an example in which an auxiliary core is applied to a second main rubber of the fluid sealing assembly according to an exemplary embodiment of the present disclosure.

Meanwhile, when the second main rubber 125 of the fluid sealing assembly 120 is vertically deformed by the vibrations and absorbs and removes the vibration, the amount of the vertical deformation may be excessive and generate a loss factor for the vibration absorption. Accordingly, as shown in FIG. 7, a separate auxiliary core 125-1 may be disposed in the central part within the second main rubber 125 to prevent the loss factor from occurring.

As a test example of the present disclosure, an acceleration booming test was performed on the engine mount of the present disclosure in which the fluid sealing assembly is detachably mounted to the rubber assembly, and the noise occurrence test was performed in the idle state. The test results are shown in FIGS. 9 and 10.

Figure 9:
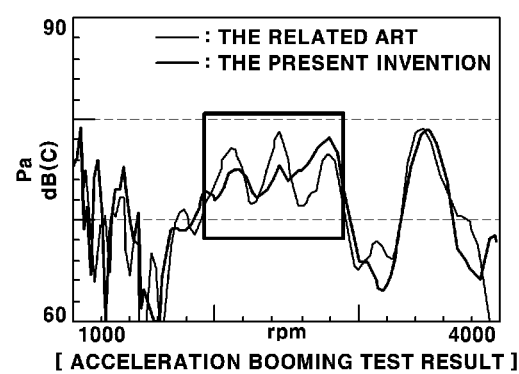
FIGS. 9 and 10 are graphs comparing vibration noise measurement results of the related art and the engine mount for a vehicle according to an exemplary embodiment of the present disclosure.
Figure 10:
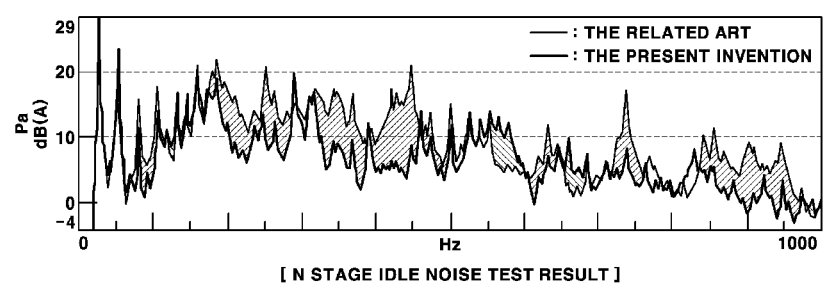
Figure 11:
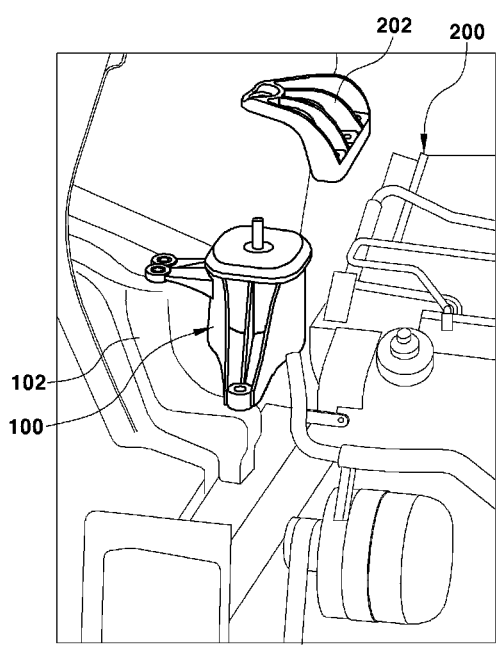
FIG. 11 is a schematic diagram showing the process of replacing an engine mount according to the related art.

The acceleration booming test result shown in FIG. 9 demonstrates that the engine mount of the present disclosure removes the vibration noise better than the engine mount of the related art. In addition, the idle state noise occurrence test result shown in FIG. 10 demonstrates that the engine mount of the present disclosure removes the high frequency component of the vibration noise better than the engine mount of the related art. The test results indicate that the engine mount of the present disclosure may exhibit the performance for removing the high frequency vibration noise. Meanwhile, the vibration control may be made by the rubber assembly alone although the vehicle is driven while the fluid sealing assembling is detached according to the customers' preference (for example, consumers who care about idling vibration). The present disclosure may have the following effects.

First, it requires only the fluid sealing assembly to be detached while the engine remains connected to the engine mount, allowing the tuning of the engine mount to be efficiently performed.

Second, since it is not necessary to replace the entire engine mount when tuning the engine mount, and thus, the cost of the tuning components may be reduced due to the sharing of the components.

Third, the vibration control characteristic values and the optimal vibration control characteristic values may be varied by physically coupling various types of fluid sealing assemblies with the rubber assembly.

Fourth, the engine vibration may be controlled by controlling the vibrations in the X, Y, and Z directions in the rubber assembly and further by controlling the vibrations in the Z direction in the fluid sealing assembly.

Fifth, the vibration control may also be made by the rubber assembly alone while the fluid sealing assembling is detached according to customers' preference (for example, consumers who care about idling vibration).

In addition, although the exemplary embodiments of the present disclosure are described above in detail, the protection scope of the present disclosure is not limited thereto. Therefore, various changes and improved forms by those skilled in the art using basic concepts of the present disclosure defined in the following claims belongs to the protection scope of the present disclosure.

What is claimed is:

1. An engine mount for a vehicle, comprising:
a rubber assembly having a rubber housing; and
a fluid sealing assembly having a fluid housing which is detachably inserted into the rubber housing of the rubber assembly,
wherein the fluid sealing assembly is configured to be detached from an upper part of the rubber assembly for tuning the engine mount,
wherein the rubber housing is configured to be connected between a vehicle body and an engine,
wherein an upper part of the rubber housing is open, and
wherein the rubber assembly includes a first main rubber vulcanized on a bottom surface of the rubber housing while surrounding a first core having a core bolt.

2. The engine mount for the vehicle of claim 1, wherein an inner diameter surface of the rubber housing includes a locking guide groove which extends downward from a top end of the rubber housing and a locking aperture which extends in a perpendicular direction from a lower end of the locking guide groove.

3. The engine mount for the vehicle of claim 1, wherein the core bolt protrudes from a bottom of the rubber housing to be coupled to a vehicle body mounting bracket.

4. The engine mount for the vehicle of claim 1, wherein an outer diameter surface of the rubber housing is protrudedly provided with a coupling end which is coupled to an engine mounting bracket.

5. An engine mount for a vehicle, comprising:
a rubber assembly having a rubber housing; and
a fluid sealing assembly having a fluid housing which is detachably inserted into the rubber housing of the rubber assembly,
wherein the fluid sealing assembly is configured to be detached from an upper part of the rubber assembly for tuning the engine mount,
wherein the rubber housing is configured to be connected between a vehicle body and an engine, and
wherein the fluid sealing assembly includes:
a fluid housing detachably inserted through an upper opening of the rubber housing;
a diaphragm disposed at an upper end inside the fluid housing to maintain air tightness of an upper side of a fluid;
an orifice structure having a fluid flow path in a vertical direction and stacked on a bottom part of the diaphragm;
a membrane stacked at an opening of a center of the orifice structure to separate an upper fluid chamber and a lower fluid chamber; and
a second main rubber having an outer circumferential surface that adheres to an inner diameter surface of the fluid housing while an edge part of an upper surface is stacked and supported on an edge of a bottom surface of the orifice structure to maintain air tightness of a lower side of the fluid and having a bottom surface that abuts an upper surface of a first main rubber of the rubber assembly.

6. The engine mount for the vehicle of claim 5, wherein a lower end part of the fluid housing is integrally formed with a plurality of hooks which are locked to an edge of a bottom surface of the second main rubber.

7. The engine mount for the vehicle of claim 5, wherein an edge part of the second main rubber includes a second core, and a lower end part of the second core protrudes through a bottom surface of the second main rubber to include an object to which a plurality of hooks are locked.

8. The engine mount for the vehicle of claim 5, wherein an outer diameter surface of the fluid housing is integrally formed with a locking protrusion that slides along a locking guide groove of the rubber housing and then is inserted into a locking aperture.

9. The engine mount for the vehicle of claim 5, wherein an outer surface of the fluid housing includes a handle which rotates the fluid housing in a locking or unlocking direction.

* * * * *